Patented Aug. 8, 1950

2,517,573

UNITED STATES PATENT OFFICE 2,517,573

MODIFICATION OF WOOL WITH BETA-PROPIOLACTONE

Harrison W. Jones and Harold P. Lundgren, Berkeley, Calif., assignors to the United States of America as represented by the Secretary of Agriculture No Drawing. Application March 23, 1950, Serial No. 151,556

7 Claims. (Cl. 8—112)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending application Serial No. 113,895, filed Sept. 2, 1949, now abandoned.

This invention relates to the chemical modification of wool, particularly by reaction thereof with beta-propiolactone under substantially anhydrous conditions.

It has been found that beta-propiolactone reacts with wool under substantially anhydrous conditions to form a chemically modified wool the properties of which are substantially different from the untreated wool. Thus the treated wool is softer and whiter; it also acquires a sheen and loses some of its natural kinkiness. Further, the felting property of the treated wool is improved over that of the natural wool; that is, felts prepared from the treated wool have a greater tensile strength than felts produced from the natural wool. Further, the treated wool forms a felt more rapidly than does the natural wool.

The chemical modification of wool in accordance with this invention involves, essentially, contacting the wool with beta-propiolactone so that it can react with this reagent. The proportion of beta-propiolactone to wool can be varied over a wide range depending on the degree of modification desired. For best results the proportion of reactants should be at least 0.3 part of beta-propiolactone per part of wool. Generally, a greater proportion of beta-propiolactone is used to ensure complete reaction. The unreacted portion of the lactone can easily be separated from the reaction mixture and re-used. It is convenient to use such an excess of the lactone that the wool can be immersed in it while the reaction is allowed to take place. In most cases it is convenient to employ the beta-propiolactone in solution form. Any inert organic solvent for the beta-propiolactone can be used, for example, ether, chloroform, carbon tetrachloride, benzene, and so forth. In any case the solvent should be substantially dry to minimize hydrolysis of the lactone. It has also been found that the wool can be reacted with beta-propiolactone in the vapor phase. In applying this modification of our process, the wool may be placed in a suitable vessel where it is subjected to vapors of beta-propiolactone. Since the lactone has a high-boiling point (51–52° C. at 11 mm. Hg), the concentration of the lactone in the atmosphere of the vessel is preferably increased by the use of low-pressures, by applying heat, or by a combination of both. The lactone may also be applied to the wool by passing warm air or other inert gas through a pool of beta-propiolactone and then contacting the lactone-containing gas stream with the sample of wool under treatment. In such type of treatment, instead of an air stream, one can use a stream of carbon tetrachloride or chloroform vapors or the vapors of any other suitable inert solvent which has a low boiling point, say, 100° C. or less. Usually, as a matter of convenience, the reaction is conducted at room temperature. However, the temperature may be varied from about 0° C. to about 100° C., the rate of the reaction increasing as the temperature is increased. In most cases, it is preferred to use a temperature below 40° C. to avoid too rapid reaction which tends to make the product somewhat brittle. The time of reaction will, of course, depend on many factors such as the type of wool, the concentration of beta-propiolactone, the temperature, and the type of product desired. In general, it is preferred that the reaction be allowed to continue until the total nitrogen content of the wool is reduced to about 12%. Such a product has especially enhanced felting properties.

Since the reagent, beta-propiolactone, reacts with water to form beta-hydroxypropionic acid, the wool should be dried before the reaction is initiated. Any of the usual drying methods may be used, for example, subjection of the wool to a current of hot (about 100° C.) air. However, to obtain thorough removal of water it is preferred to wash the wool with an organic solvent to displace water from the fibers. For this purpose it is preferred to wash the wool successively with absolute alcohol, dry benzene, and dry ether. However, such vigorous washing is not necessary in all cases.

After the reaction of the wool and the beta-propiolactone has been carried out, the chemically modified wool is mechanically treated as by wringing, centrifuging or the like to remove excess reagent. Any residual beta-propiolactone is then removed by washing with an inert solvent, as, for example, ether, carbon tetrachloride, chloroform, benzene, and so forth. In many cases it is advisable to also wash the modified wool with an aqueous solution of a weak or moderately alkaline material to remove any beta-hydroxypropionic acid which may have been formed by hydrolysis of beta-propiolactone. As the alkaline material, sodium bicarbonate is preferred although one may use similar materials such as potassium bicarbonate, ammonium hydroxyde, sodium carbonate, potassium carbonate, and so forth. If an alkaline wash is used, it is preferable to then wash excess alkaline material from the wool with water.

With regard to the chemical reactions which take place in carrying out the process of this invention, it has been determined that the wool actually combines with the beta-propiolactone without destroying the polypeptide chain which makes up the wool molecule. The beta-propiolactone attaches to various groups present in the wool molecule such as amino, hydroxyl, phenol, and carboxyl groups without breaking the polypeptide chain. The following equations illustrate the mechanism of the reaction:

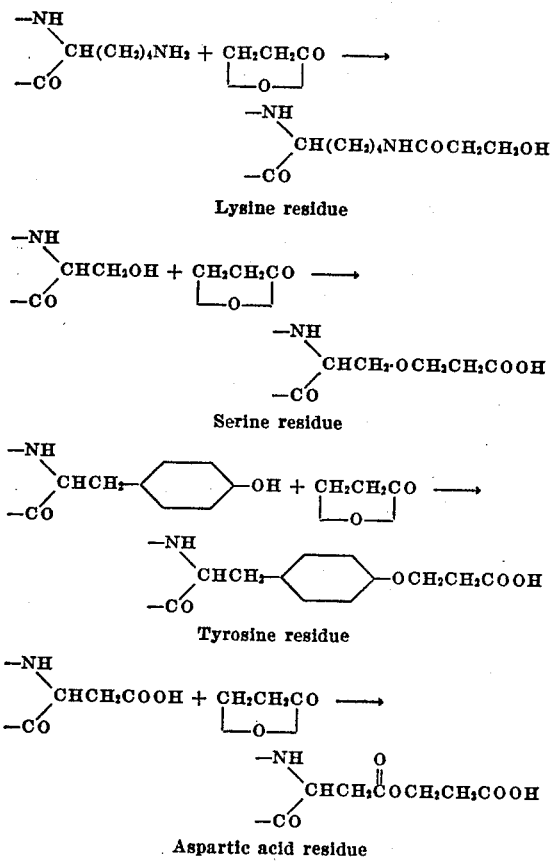

It is evident from these equations that the beta-propiolactone attaches to various radicals such as amino, imino, hydroxyl, and carboxyl without altering the chain structure of the basic molecule.

The reaction of beta-propiolactone with wool does not alter the physical form of the wool fibers except to increase somewhat the diameter of the fibers. Thus in general it has been observed that when sufficient beta-propiolactone has reacted with the wool to reduce its total nitrogen content to about 12%, the diameter of the wool fibers is increased by about 30%. X-ray studies have shown that the scale structure of the wool fibers is retained in the modified wool so that the process is not merely a surface modification but involves actual chemical change of the fiber itself.

The following examples disclose particular steps and conditions within the scope of this invention, but it is to be understood that these examples are furnished only by way of illustration and not limitation.

EXAMPLE I

A 10 gram sample of New Zealand merino wool was dried by washing it successively with absolute alcohol, dry benzene, and anhydrous ether. The wool was then immersed in 500 ml. of a 20% solution of beta-propiolactone in ether. The wool was allowed to remain in the solution for 24 hours. After this period of time the wool was removed from the solution, squeezed to remove excess solution then washed successively with ether, dilute aqueous (about 0.5M) sodium bicarbonate solution, and water. The sample was then dried in warm air.

It was observed that the product was softer and whiter than the original wool; further, it had acquired a sheen and was less kinky than the original material.

A sample of the product and a sample of the original wool were made into felt pads by a standard procedure of carding and padding. The felt pads were tested for tensile strength and it was found that the felt prepared from the beta-propiolactone treated wool had a tensile strength twice that of the felt pad produced from the untreated wool.

EXAMPLE II

A sample of New Zealand merino wool was dried and reacted with beta-propiolactone as set forth in Example I, the only difference being that in this case, the wool was allowed to stand in the beta-propiolactone solution for 48 hours. The product was formed into a felt pad and it was determined that the felt pad had a tensile strength of 2.3 times that of a felt pad produced from the untreated wool.

EXAMPLE III

A 10-gram sample of New Zealand merino wool was dried and immersed in 50 ml. of beta-propiolactone and allowed to remain in the liquid at room temperature (20° C.) for 2 days. The chemically modified wool was then removed and squeezed to remove excess liquid then washed successively with ether, dilute aqueous sodium bicarbonate solution, and water. The sample was then dried in warm air. Analysis indicated that the chemically-modified wool had a total nitrogen content (Kjeldahl method) of 11.1%.

EXAMPLE IV

A batch of New Zealand merino wool was divided into 10-gram samples and each sample was reacted with 250 ml. of a solution of beta-propiolactone using various solvents, concentrations, and conditions as set forth hereinafter. After the reaction with the beta-propiolactone was completed, the samples of chemically-modified wool were treated to remove excess liquid, washed, and dried as set forth in Example I. The various conditions used and the results obtained are set forth in the following table:

*Table 1*

| Expt. No. | Reaction liquid | Time of reaction | Temperature of reaction | Total nitrogen content of product (Kjeldahl method) | Amino nitrogen content of product (Van Slyke method) |
|---|---|---|---|---|---|
| | | Days | °C. | Per cent | Per cent |
| 1 | none used (control) | | | 16.8 | 0.29 |
| 2 | 20% solution of beta-propiolactone in ether | 1 | 4 | 15.7 | 0.17 |
| 3 | ----do---- | 3 | 4 | 15.4 | 0.22 |
| 4 | ----do---- | 1 | 20 | 16.4 | 0.26 |
| 5 | ----do---- | 1 | 20 | 16.5 | 0.23 |
| 6 | ----do---- | 1 | 20 | 15.5 | 0.20 |
| 7 | ----do---- | 2 | 20 | 14.6 | 0.18 |
| 8 | ----do---- | 3 | 20 | 11.6 | 0.08 |
| 9 | 20% solution of beta-propiolactone in ether | 3 | 20 | 11.7 | 0.13 |
| 10 | 20% solution of beta-propiolactone in ether | 7 | 20 | 7.2 | 0.07 |
| 11 | 20% solution of beta-propiolactone in chloroform | 1 | 40 | 10.7 | 0.07 |

In experiments Nos. 2, 3, 6, 7, 8, 9, 10, and 11, the wool was dried before carrying out the reaction by washing it successively with absolute alcohol, dry benzene, and dry ether. In experiment No. 4, the wool was given no drying treatment. In experiment No. 5, the wool was first dried by placing it in an oven at 110° C. for 1 day.

EXAMPLE V—VAPOR PHASE TREATMENT

A 1.5-gram sample of scoured wool was dried 24 hours under vacuum at 55° C.

The dry wool was then placed on a watch glass enclosed in a large glass jar. A beaker containing beta-propiolactone was also placed in the jar. The jar was then sealed and the vent in the lid was connected to a vacuum pump to exhaust the air from the jar and to obtain a maximum concentration of the lactone in the atmosphere within the jar. The pressure in the jar was reduced to approximately 8 mm. of Hg and maintained at around this value for seven days, the jar being maintained at room temperature (20–25° C.). After this period of time, the treated wool sample was removed, washed and dried. The chemically-modified wool had a nitrogen content of 14.03% and a sample of felt prepared therefrom had a tensile strength twice that of felt produced from the original, untreated wool felted under identical conditions.

Having thus described the invention, what is claimed is:

1. A process for chemically modifying wool comprising reacting wool with beta-propiolactone under substantially anhydrous conditions.

2. A process in accordance with claim 1 wherein the beta-propiolactone is in the liquid phase.

3. A process in accordance with claim 1 wherein the beta-propiolactone is dissolved in an inert organic solvent.

4. A process in accordance with claim 1 wherein the beta-propiolactone is in the vapor phase.

5. A process for chemically modifying wool comprising reacting wool with beta-propiolactone under substantially anhydrous conditions at a temperature from about 0° C. to 100° C. for a period of about from 1 to 3 days, said beta-propiolactone being employed in the proportion of at least 0.3 part per part of the wool.

6. A process for chemically modifying wool comprising reacting wool, under substantially anhydrous conditions, with beta-propiolactone dissolved in an inert organic solvent at a temperature of about 20° C. until the nitrogen content of the wool has been reduced to about 12%, said beta-propiolactone being employed in the proportion of at least 0.3 part per part of the wool.

7. A chemically modified wool which consists of the original polypeptide chain which makes up the wool molecule and in which the free hydroxyl groups are etherified by the —OCH$_2$CH$_2$COOH group, in which the free amino and imino groups are amidified by the

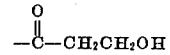

group, and in which the free carboxyl groups are esterified by the —OCH$_2$CH$_2$COOH group.

HARRISON W. JONES.
HAROLD P. LUNDGREN.

REFERENCES CITED

The following references are of record in the file of this patent:

UNITED STATES PATENTS

| Number | Name | Date |
|---|---|---|
| 1,685,168 | Martin | Sept. 25, 1928 |

FOREIGN PATENTS

| Number | Country | Date |
|---|---|---|
| 249,942 | Germany | Aug. 2, 1912 |
| 14,675 | Australia | Oct. 10, 1933 |